Oct. 16, 1956 R. E. LAFFERTY 2,767,254

MAGNETIC RECORDING

Filed Sept. 28, 1951

INVENTOR
RAYMOND E. LAFFERTY
BY Morris A. Rabkin
ATTORNEY

United States Patent Office 2,767,254
Patented Oct. 16, 1956

2,767,254

MAGNETIC RECORDING

Raymond E. Lafferty, Fair Lawn, N. J., assignor to Radio Corporation of America, a corporation of Delaware Application September 28, 1951, Serial No. 248,857

The terminal 15 years of the term of the patent to be granted has been disclaimed 6 Claims. (Cl. 179—100.2)

Figure 1:
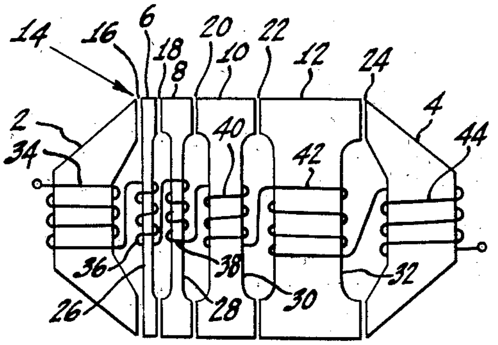

This invention relates to magnetic recording, and more particularly to a time delay system such as may be used for synthetic reverberations in broadcasting or recording studios.

Although broadcasting and recording studios are designed to reduce echoes and reverberations to a minimum, there frequently arises a situation in which a reverberatory sound effect is desired. Heretofore, when such an effect was desired, resort was usually had to a reverberation chamber, generally in the form of a large, room-like affair having a loud-speaker at one end, a microphone at the other, and a tortuous path for the sound waves in between the two. This type of equipment is usually large and cumbersome, usually occupying considerable valuable space.

It has also been suggested that reverberations may be synthesized by recording the original sound on a recording medium and reproducing the sound by playing it back through a plurality of spaced playback heads. Such a system is shown in U. S. Patent No. 2,354,176 to Goldsmith. However, there are certain objectionable characteristics demonstrated by these previous methods of synthesizing reverberations by means of recording apparatus. As is well known, reverberation is caused by a blend of a multitude of reflections of sound waves. If the time delay of the synthesizer is excessive, certain types of sounds will not produce a blend of waves. For example, the click of a door latch or of a heel, or the tap of a cane will be reproduced as a series of discrete clicks or taps. In order to prevent the production of the series of discrete pulses of sound, the time delay should be not more than 25 milliseconds. Such a short time delay may be accomplished in one of two ways. The recording medium may be driven at a high speed, or the playback heads may be placed very close together. One of the most convenient recording media available is magnetic tape. However, from practical considerations, the upper limit of speed at which such tape can be driven conveniently is about thirty inches per second. Under that condition, the spacing between separate playback heads would be no more than three-fourths of an inch. This dimension must include any magnetic shielding used in connection with the heads and is difficult to attain in practice. Accordingly, it is an object of the present invention to provide an improved synthetic reverberation system.

It is another object of this invention to provide a synthetic reverberation system employing magnetic recording techniques characterized by very short time delay between successive, reproduced sound pulses.

Still another object of this invention is to provide an improved magnetic playback head suitable for use in synthetic reverberation systems.

In accomplishing these and other objects, there has been provided, in accordance with the present invention, a synthetic reverberation system comprising an input circuit, an output circuit each including suitable amplifiers, and a magnetic recording playback system. The playback head is of novel construction, having a plurality of spaced-apart signal reading gaps in a single head. Each time a signal recorded on the magnetic tape passes one of the gaps, a corresponding current is generated in the coils of the head. A portion of these currents, suitably amplified, is fed to the output circuit. Another portion of the signal current is fed back to the recording head and rerecorded. Thus, a prolonged reverberation is synthesized. By having a plurality of signal reading gaps in a single head, the necessity for a plurality of playback heads is obviated, eliminating the problems involved in excessive tape speed and the difficulty of small head spacing.

Figure 2:
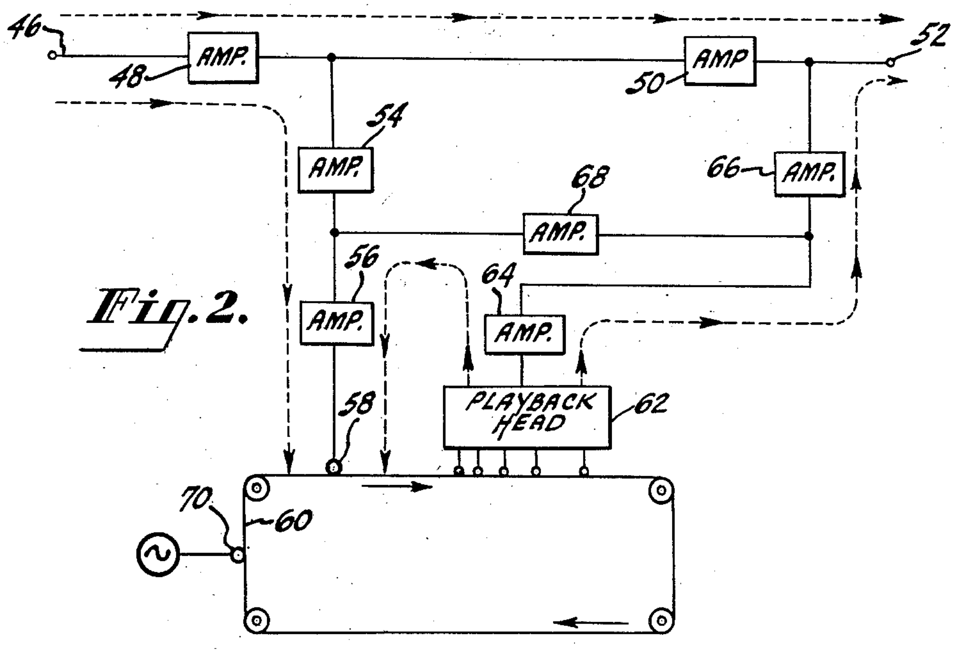

A better understanding of the present invention may be had from the following detailed description when read in connection with the accompanying drawing in which, Figure 1 is a schematic representation of an improved playback head made in accordance with the present invention, and Figure 2 is a schematic diagram of a synthetic reverberation system according to the present invention.

Referring now to the drawings in more particularity, there is shown, in Figure 1, a multiple gap playback head. The head is formed of a plurality of core sections of ferro-magnetic material, including two end sections 2 and 4 and several intermediate core sections 6, 8, 10 and 12. These sections are assembled with the two end sections constituting the extremes of the head and the intermediate sections positioned successively therebetween. Thus assembled, one edge surface 14 of the head constitutes a tape contacting surface. Adjacent confronting faces of the core sections distributed along this tape contacting surface define non-magnetic signal reading gaps 16, 18, 20, 22 and 24. In accordance with usual practice, suitable spacers of conductive, non-magnetic material, such as beryllium-copper, may be inserted in these gaps. All of the gaps thus defined will, of course, be of equal length in the direction of travel of the tape.

On the side of the head opposite from the tape contacting surface, commonly called the back of the head, the core structure is again divided into a plurality of sections corresponding to those along the tape contacting surface. The core sections along the tape contacting surface and the corresponding sections along the back of the head are joined, respectively, by legs 26, 28, 30, 32 of ferromagnetic material, thus producing symmetry of structure about a central longitudinal axis. It will, of course, be appreciated that these legs may be integral with the corresponding core sections. Around each of these legs, including those of the two end sections, there is wound a signal coil 34—44. These coils are arranged and connected to be in a series-aiding relationship for signals produced across the signal reading gaps. At the same time, the coils are in a series-opposing relationship for stray magnetic fields to which the head might be subjected. In the illustrated form of the head made in accordance with the present invention, the intermediate core sections 6, 8, 10 and 12 are made successively wider, causing adjacent gaps to be separated by successively greater distances. Without departing from the spirit and scope of the present invention, however, the intermediate section may be made of substantially identical size, spacing the successive adjacent gaps at substantially equal intervals.

The synthetic reverberation system, which includes a playback head of the type just described, has an input circuit 46. This input may be supplied from a microphone or, as in the case of rerecording, from a record playback device. The input is connected, through suitable amplifier stages 48, 50, directly to an output circuit 52. The output circuit may be connected to an appropriate utilization device such as a loud-speaker, the input of a transmitter, or to the input of a recording apparatus.

A portion of the signal supplied to the input circuit 46 is tapped off and fed, through suitable amplifier stages 54, 56 to a magnetic recording head 58. There, the signal is recorded as magnetic impressions on an endless magnetic record tape 60. The moving tape carries the magnetic impressions of the signals to a multiple gap playback head 62 of the type previously described.

In the playback head, the magnetic impressions are reconverted into electrical signals at each of the plurality of gaps. Since the several coils of the head are serially connected, the signals produced at each of the gaps will be superimposed upon the signals produced at each of the other gaps. A portion of the blended signals from the playback head is fed, through suitable amplifier stages 64 and 66, to the output circuit 52 where it is superimposed upon that portion of the signal feed directly to the output circuit from the input circuit. Another portion of the signal from the playback head is fed back, again through a suitable amplifier 68, to the recording head 58 where the blended signal is recorded on the endless tape. The spacing between the recording head and the playback head is not critical. However, the spacing should be no greater than the spacing between the first and last gap of the playback head. Thus, when the signals generated in the playback head are fed back to the record head, recorded on the tape, and again picked up by the playback head, there results a smooth blend of reverberatory signals. By a careful control of the amplitude of the signals by known means, the reverberatory signals can be progressively attenuated to produce a natural sounding decay.

An appropriate erasing head 70 is positioned along the path of the tape in engagement therewith, ahead of the recording head, for erasing the signals recorded thereon.

Thus, it may be seen that there has been provided, in the present invention, an improved system for synthesizing sound reverberations. By using a playback head having a plurality of signal reading gaps the time delay between successive sound pulses may be reduced to a point where a smooth blend of "reflected" waves is produced without necessitating an excessive speed for the tape.

What is claimed is:

1. A synthetic reverberation system including a magnetic recording time delay means, a magnetic record medium, a magnetic recording head positioned for operative engagement with said medium, a signal input circuit connected to said recording head whereby electrical signals supplied to said input circuit are recorded as magnetic impressions on said medium, a reproducing head having a ferromagnetic core structure and a plurality of non-magnetic signal reading gaps of substantially equal length positioned longitudinally of said medium for simultaneous operative engagement with said medium whereby said magnetic impressions are reconverted to electrical signals at each of said gaps, and an output circuit connected to said reproducing head.

2. The invention as set forth in claim 1 characterized by the addition of a feedback circuit interconnecting said output circuit and said input circuit.

3. A magnetic reproducing head comprising a ferromagnetic core structure, said core structure having a record medium contacting surface and being divided into a plurality of sections spaced longitudinally of said contacting surface said plurality of sections being positioned for simultaneous operative engagement with a record medium, the faces of adjacent ones of said sections defining non-magnetic signal reading gaps of substantially equal length.

4. A magnetic reproducing head comprising a ferromagnetic core structure, said core structure having a record medium contacting surface and being divided into a plurality of sections along said contacting surface, the faces of adjacent ones of said sections defining non-magnetic signal reading gaps of substantially equal length, the spacing between adjacent gaps being progressively greater.

5. A magnetic reproducing head comprising a ferromagnetic core structure, said core structure having a record medium contacting surface and a back surface, said core structure being divided into a plurality of sections along said contacting surface and a corresponding number of sections along said back surface, a plurality of leg members corresponding in number to the sections along said contacting surface, said sections along said contacting surface being joined to corresponding ones of said sections along said back surface by said corresponding leg members, the faces of adjacent ones of said sections along said contacting surface defining non-magnetic signal reading gaps of substantially equal length, and signal coils wound around each of said leg members, said coil being connected in a series-aiding relationship for signals produced across said signal reading gaps.

6. In a synthetic reverberation system for use with a magnetic record medium, the combination of a magnetic recording head adapted to be positioned for operative engagement with said medium, a signal input circuit connected to said recording head whereby electrical signals supplied to said input circuit are recorded as magnetic impressions on said medium, a reproducing head having a magnetic core structure and a plurality of non-magnetic signal reading gaps of substantially equal length, said reproducing head being adapted to be positioned for simultaneous operative engagement with said medium of its said gaps and with its said gaps spaced longitudinally of said medium whereby said reproducing head is capable of reconverting said magnetic impressions into electrical signals at each of said gaps, and an output circuit connected to said reproducing head.

References Cited in the file of this patent

UNITED STATES PATENTS

| | | |
|---|---|---|
| 2,352,023 | Schuller | June 20, 1944 |
| 2,536,810 | Holmes | Jan. 2, 1951 |
| 2,540,711 | Camras | Feb. 6, 1951 |
| 2,594,934 | Kornei | Apr. 29, 1952 |
| 2,596,912 | Nygaard | May 13, 1952 |
| 2,700,588 | Williams | Jan. 25, 1955 |

FOREIGN PATENTS

| | | |
|---|---|---|
| 617,796 | Germany | Aug. 28, 1935 |